US012095902B2

(12) United States Patent
Taga et al.

(10) Patent No.: US 12,095,902 B2
(45) Date of Patent: Sep. 17, 2024

(54) INFORMATION PROCESSING TERMINAL, INFORMATION PROCESSING DEVICE, INFORMATION PROCESSING METHOD, PROGRAM, AND INFORMATION PROCESSING SYSTEM

(71) Applicant: FELICA NETWORKS, INC., Tokyo (JP)

(72) Inventors: Shota Taga, Tokyo (JP); Junji Goto, Chiba (JP)

(73) Assignee: FELICA NETWORKS, INC., Tokyo (JP)

( * ) Notice: Subject to any disclaimer, the term of this patent is extended or adjusted under 35 U.S.C. 154(b) by 296 days.

(21) Appl. No.: 17/601,585

(22) PCT Filed: Mar. 27, 2020

(86) PCT No.: PCT/JP2020/014169
§ 371 (c)(1),
(2) Date: Oct. 5, 2021

(87) PCT Pub. No.: WO2020/209106
PCT Pub. Date: Oct. 15, 2020

(65) Prior Publication Data
US 2022/0216985 A1 Jul. 7, 2022

(30) Foreign Application Priority Data
Apr. 12, 2019 (JP) ................. 2019-076456

(51) Int. Cl.
*H04L 9/08* (2006.01)
*H04L 9/14* (2006.01)
(52) U.S. Cl.
CPC .......... *H04L 9/0825* (2013.01); *H04L 9/0861* (2013.01); *H04L 9/14* (2013.01)

(58) Field of Classification Search
CPC ....... H04L 9/0825; H04L 9/0861; H04L 9/14; H04L 9/0894; H04L 9/0891; G06F 21/6209
See application file for complete search history.

(56) References Cited

U.S. PATENT DOCUMENTS 8,572,410 B1 * 10/2013 Tkacik ................. H04L 9/0861
713/192
2006/0179309 A1 8/2006 Cross
(Continued)

FOREIGN PATENT DOCUMENTS

| CN | 102543131 A | 7/2012 |
| JP | 2008-242720 A | 10/2008 |

(Continued)

*Primary Examiner* — Shin-Hon (Eric) Chen
*Assistant Examiner* — Ethan V Vo
(74) *Attorney, Agent, or Firm* — Paratus Law Group, PLLC

(57) ABSTRACT

There is provided an information processing terminal, an information processing device, an information processing method, a program, and an information processing system which enable key change to be performed more reliably. A user terminal includes: a secure element that has a protection area in which an area in which data to be protected is stored is protected by an encryption key; and a processing execution unit that executes a process of changing, in the secure element, a first key used at a time of shipment to a second key different from the first key. Setting information which is referred to when the first key is changed to the second key is stored at the time of shipment in the protection area. A server device includes: a tamper resistant device that stores a master key serving as a master of the first key and is protected from analysis from outside; and a processing device that performs, by using the master key stored in the tamper resistant device, a process of changing the first key to the second key on the basis of the setting information. The (Continued)

present technology can be applied to, for example, an information processing system that provides a settlement service.

14 Claims, 5 Drawing Sheets

(56) References Cited

U.S. PATENT DOCUMENTS

| | | | |
|---|---|---|---|
| 2011/0085664 A1 | 4/2011 | Cross | |
| 2012/0303310 A1* | 11/2012 | Musfeldt | H04L 9/3234 |
| | | | 702/123 |
| 2013/0111599 A1* | 5/2013 | Gargiulo | G06F 21/6245 |
| | | | 726/26 |
| 2014/0219442 A1* | 8/2014 | Card | H04L 9/0869 |
| | | | 380/44 |
| 2015/0326545 A1* | 11/2015 | Khan | H04L 63/0823 |
| | | | 713/171 |
| 2016/0226847 A1* | 8/2016 | Bone | H04W 12/04 |
| 2016/0352706 A1* | 12/2016 | Peeters | H04L 63/061 |
| 2017/0163417 A1* | 6/2017 | McLean | H04L 63/062 |
| 2017/0374063 A1* | 12/2017 | Wimböck | H04W 12/04 |
| 2018/0234235 A1 | 8/2018 | Ye | |
| 2018/0278415 A1* | 9/2018 | Von Der Lippe | G06F 21/62 |
| 2019/0172062 A1* | 6/2019 | Koh | G06Q 20/32 |
| 2019/0289454 A1* | 9/2019 | Inoue | H04W 12/40 |
| 2021/0092603 A1* | 3/2021 | Yang | H04L 9/0822 |

FOREIGN PATENT DOCUMENTS

| | | |
|---|---|---|
| JP | 2011-197928 A | 10/2011 |
| JP | 2017-503383 A | 1/2017 |
| JP | 2017-046038 A | 3/2017 |
| JP | 6174229 B1 | 8/2017 |
| JP | 6397200 B2 | 9/2018 |

* cited by examiner

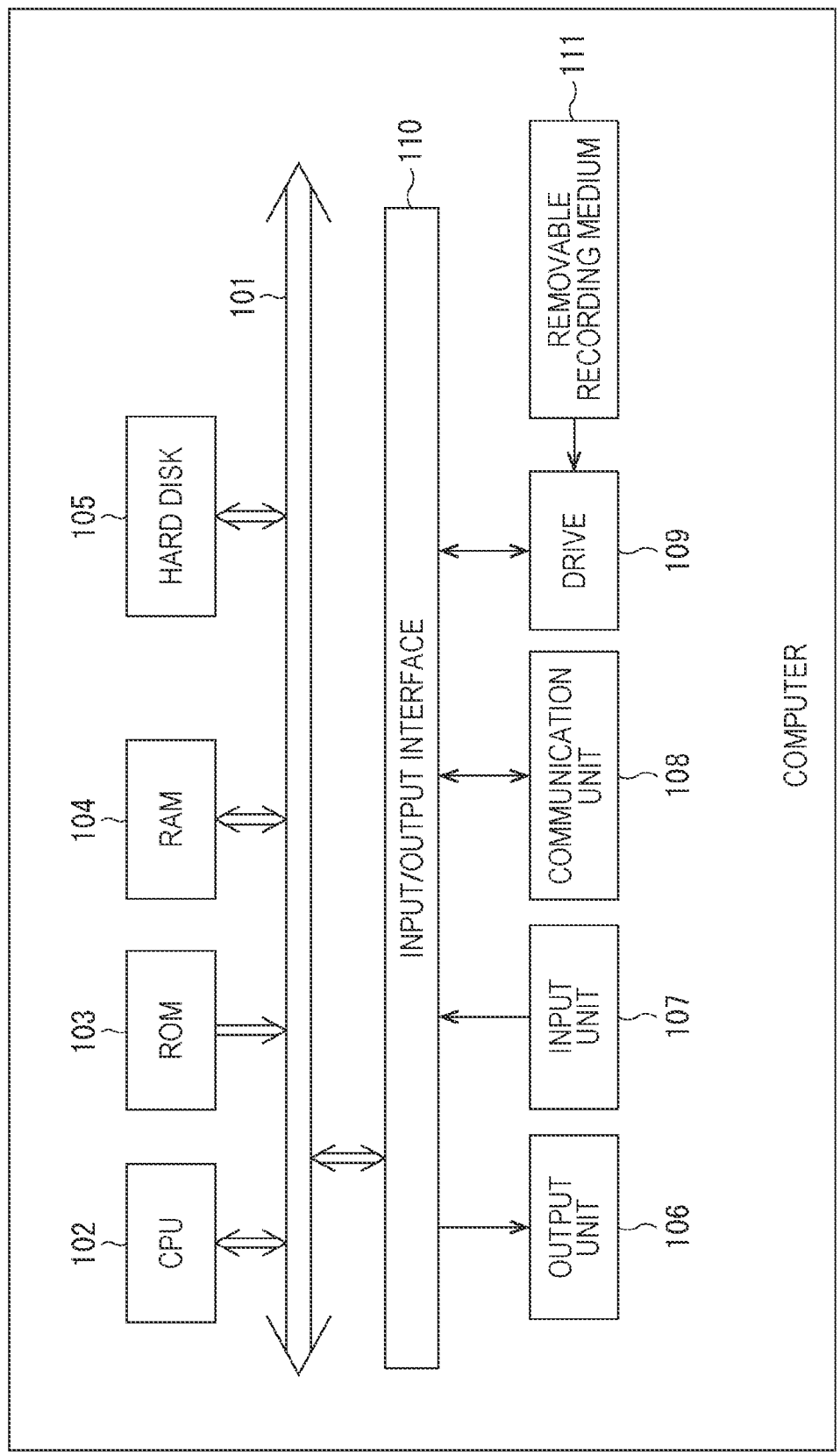

INFORMATION PROCESSING TERMINAL, INFORMATION PROCESSING DEVICE, INFORMATION PROCESSING METHOD, PROGRAM, AND INFORMATION PROCESSING SYSTEM

CROSS REFERENCE TO PRIOR APPLICATION

This application is a National Stage Patent Application of PCT International Patent Application No. PCT/JP2020/014169 (filed on Mar. 27, 2020) under 35 U.S.C. § 371, which claims priority to Japanese Patent Application No. 2019-076456 (filed on Apr. 12, 2019), which are all hereby incorporated by reference in their entirety.

TECHNICAL FIELD

The present disclosure relates to an information processing terminal, an information processing device, an information processing method, a program, and an information processing system, and more particularly, to an information processing terminal, an information processing device, an information processing method, a program, and an information processing system capable of more reliably performing a key change.

BACKGROUND ART

Conventionally, a settlement service of making a settlement by electronic money using an information processing terminal such as a so-called smartphone has been provided. Then, when an application for performing a settlement service is stored in a secure element of a mobile terminal, it is possible to provide a more secure settlement service.

For example, Patent Document 1 discloses a management server that receives system configuration information necessary for accessing a secure element of a communication terminal and writes service data. Furthermore, Patent Document 2 discloses a notification method for configuring a secure element using information stored in a memory of a terminal outside the secure element.

CITATION LIST

Patent Document

Patent Document 1: Japanese Patent No. 6397200
Patent Document 2: Japanese Published Patent Publication No. 2017-503383

SUMMARY OF THE INVENTION

Problems to be Solved by the Invention

Incidentally, when initializing the application for performing a settlement service, it is necessary to change a key for protecting the secure element storing the application from a key at the time of shipment. However, since the information regarding the key at the time of shipment varies depending on a chip vendor which manufactures a semiconductor chip provided with the secure element, the type of the semiconductor chip, and the like, it is assumed that it is difficult to reliably change the key.

The present disclosure has been made in view of such a situation, and an object thereof is to enable more reliable key change.

Solutions to Problems

An information processing terminal according to a first aspect of the present disclosure includes: a secure element that has a protection area in which an area in which data to be protected is stored is protected by an encryption key; and a processing execution unit that executes a process of changing, in the secure element, a first key which is the encryption key used at a time of shipment to a second key which is the encryption key different from the first key. Setting information which is referred to when the first key is changed to the second key is stored at the time of shipment in the protection area.

An information processing method or a program according to the first aspect of the present disclosure includes: performing, in a secure element having a protection area in which an area in which data to be protected is stored is protected by an encryption key, a process of changing a first key which is the encryption key used at a time of shipment to a second key which is the encryption key different from the first key. Setting information which is referred to when the first key is changed to the second key is stored at the time of shipment in the protection area.

In the first aspect of the present disclosure, the process of changing the first key which is the encryption key used at the time of shipment to the second key which is the encryption key different from the first key is performed in the secure element having the protection area in which the area in which data to be protected is stored is protected by the encryption key. Then, in the protection area, the setting information which is referred to when the first key is changed to the second key is stored at the time of shipment.

An information processing device according to a second aspect of the present disclosure includes: a tamper resistant device that stores a master key serving as a master of a first key which is an encryption key used at a time of shipment in a secure element of a user terminal having a protection area in which an area in which data to be protected is stored is protected by the encryption key, and is protected from analysis from outside; and a processing device that performs, by using the master key stored in the tamper resistant device, a process of changing the first key to a second key on the basis of setting information which is stored at the time of shipment in the protection area and referred to when the first key is changed to the second key which is the encryption key different from the first key.

An information processing method or a program according to the second aspect of the present disclosure includes: performing, by using a master key stored in a tamper resistant device that stores the master key serving as a master of a first key which is an encryption key used at a time of shipment in a secure element of a user terminal having a protection area in which an area in which data to be protected is stored is protected by the encryption key, and is protected from analysis from outside, a process of changing the first key to a second key on the basis of setting information which is stored at the time of shipment in the protection area and referred to when the first key is changed to the second key which is the encryption key different from the first key.

In the second aspect of the present disclosure, the process of changing the first key to the second key on the basis of the setting information which is stored at the time of shipment in the protection area and referred to when the first key is changed to the second key which is the encryption key different from the first key is performed by using the master key stored in the tamper resistant device that stores the master key serving as the master of the first key which is the encryption key used at the time of shipment in the secure element of the user terminal having the protection area in which the area in which data to be protected is stored is protected by the encryption key, and is protected from analysis from outside.

An information processing system according to a third aspect of the present disclosure includes: a secure element that has a protection area in which an area in which data to be protected is stored is protected by an encryption key; and a processing execution unit that executes a process of changing, in the secure element, a first key which is the encryption key used at a time of shipment to a second key which is the encryption key different from the first key. Setting information which is referred to when the first key is changed to the second key is stored at the time of shipment in the protection area, and a user terminal is connected via a network to a server device that includes a tamper resistant device that stores a master key serving as a master of the first key and is protected from analysis from outside, and a processing device that performs, by using the master key stored in the tamper resistant device, a process of changing the first key to the second key on the basis of the setting information.

In the third aspect of the present disclosure, a process is executed in which in the secure element having the protection area in which the area in which data to be protected is stored is protected by the encryption key, the first key which is the encryption key used at the time of shipment is changed to the second key which is the encryption key different from the first key. In the protection area, the setting information which is referred to when the first key is changed to the second key is stored at the time of shipment. Furthermore, a process is executed in which the first key is changed to the second key on the basis of the setting information by using the master key stored in the tamper resistant device that stores the master key serving as the master of the first key and is protected from analysis from outside.

BRIEF DESCRIPTION OF DRAWINGS

FIG. 5 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

<Initial Setting Process>

First, an initial setting process executed in an information processing system to which the present technology is applied will be described with reference to FIG. 1.

Figure 1:
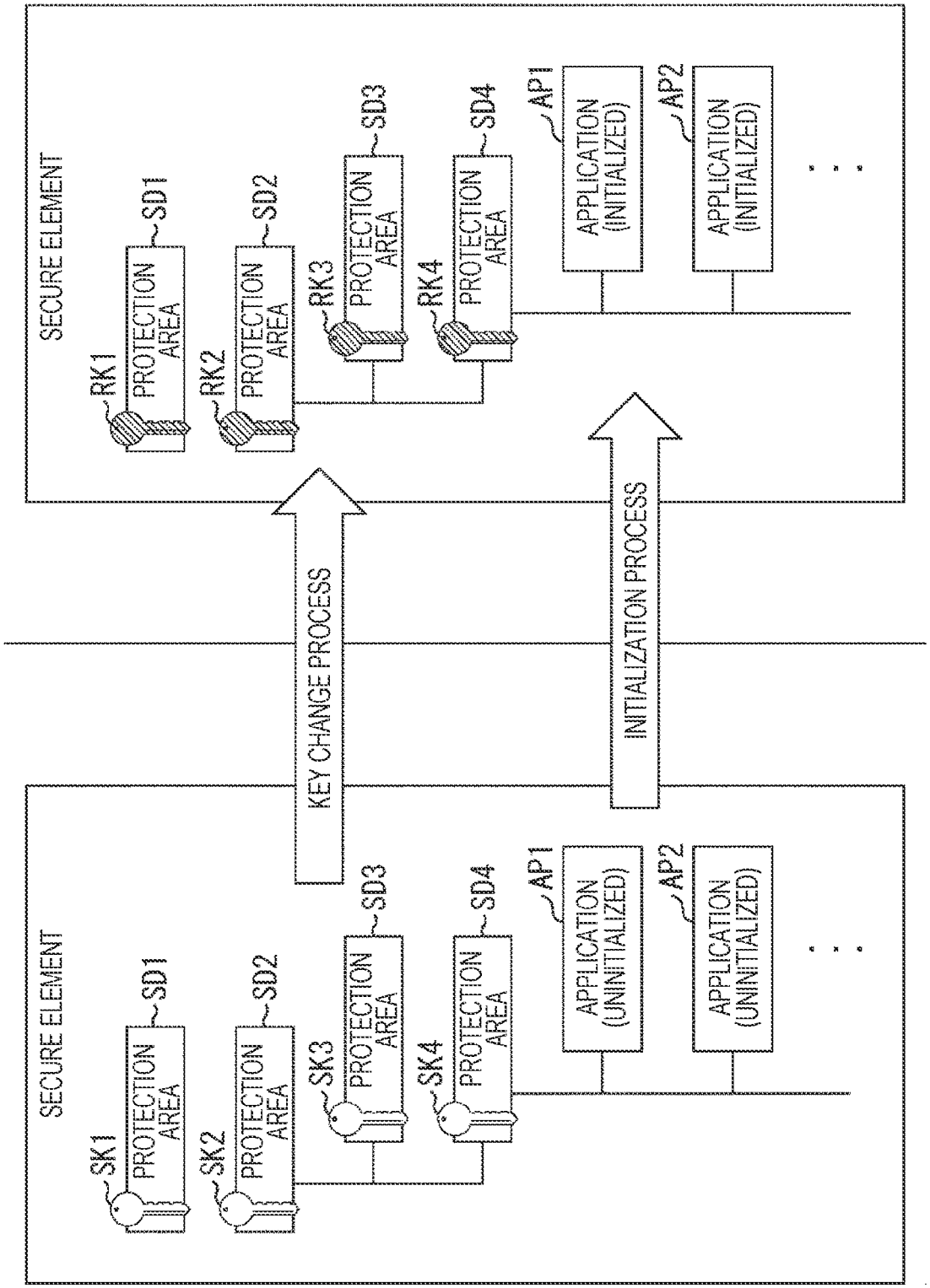
FIG. 1 is a diagram illustrating an initial setting process executed in an information processing system to which the present technology is applied.

FIG. 1 schematically illustrates a data structure of a secure element (a secure element 22 of a user terminal 13 illustrated in FIG. 2 to be described later) included in a user terminal configuring the information processing system. For example, the left side of FIG. 1 illustrates the data structure of the secure element in a state before the initial setting process is performed, and the right side of FIG. 1 illustrates the data structure of the secure element in a state after the initial setting process is performed.

For example, the secure element is provided with a plurality of protection areas SD as areas for storing various type of data, applications, and the like to be protected, and these protection areas SD can have a hierarchical structure. In the example illustrated in FIG. 1, four protection areas SD1 to SD4 are provided, and a hierarchical structure is formed in which the protection areas SD3 and SD4 are arranged below the protection area SD2. Then, in the example illustrated in FIG. 1, applications AP1 and AP2 operating in the secure element are stored in the protection area SD4.

Furthermore, in the secure element, the protection area SD is protected by an encryption key for encryption. For example, in a state before the initial setting process is performed, specifically, in the state of being shipped from a chip vendor, the protection areas SD1 to SD4 are protected by shipment keys SK1 to SK4, respectively. Here, a shipment key SK is a key which is jointly managed by a chip vendor which manufactures a semiconductor chip provided with the secure element and a service provider which provides a service using the application AP. Note that in a state before the initial setting process is performed, the applications AP1 and AP2 are not initialized and are in an uninitialized state.

Then, in the initial setting process, first, a key change process is performed which changes the shipment key SK protecting the protection area SD to a main key RK which is a key managed only by the service provider. Therefore, the shipment keys SK1 to SK4 are changed to main keys RK1 to RK4, and the protection areas SD1 to SD4 are protected by the main keys RK1 to RK4, respectively.

Thereafter, in the initial setting process, an initialization process is performed which initializes the applications AP1 and AP2 in the uninitialized state to a state in which a service is available. This initialization process is performed, for example, in accordance with information individually held for every user terminal. Therefore, the applications AP1 and AP2 are initialized for every user terminal, and the services provided by the applications AP1 and AP2 become available.

As described above, when the application AP is initialized after the protection of the protection area SD is changed from the shipment key SK to the main key RK, the application AP requiring higher security can be executed using the secure element. For example, the service provider can more safely provide a settlement service of making a settlement by electronic money.

Incidentally, in order for the service provider to execute the initial setting process of the secure element and perform the initialization process for the application, it is necessary to perform the key change process more reliably. In this regard, in the following, an embodiment for reliably performing the key change process in the initial setting process of the secure element will be described in detail.

<Configuration Example of Information Processing System>

Figure 2:
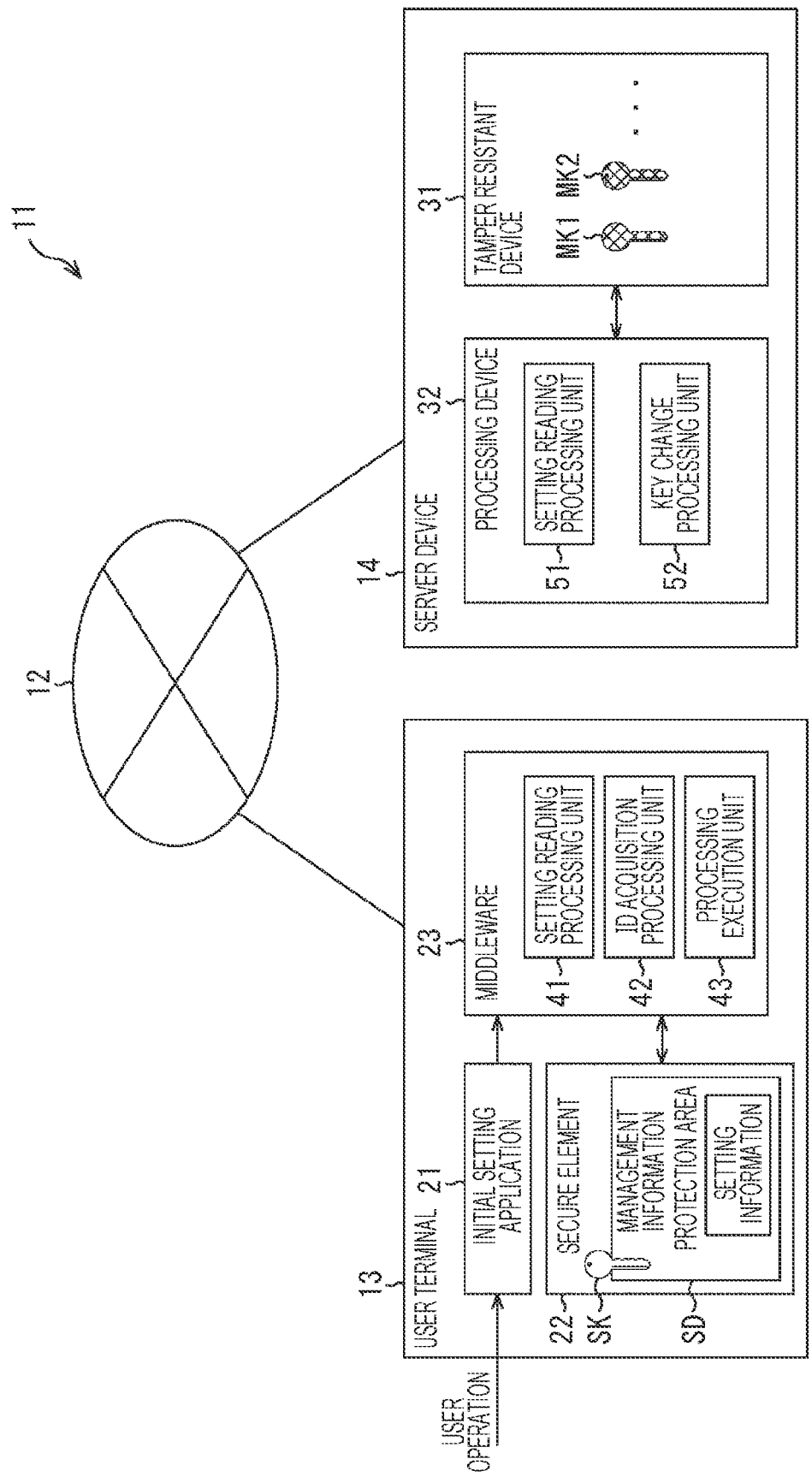
FIG. 2 is a block diagram illustrating a configuration example of an embodiment of the information processing system to which the present technology is applied.

FIG. 2 is a block diagram illustrating a configuration example of an embodiment of the information processing system to which the present technology is applied.

As illustrated in FIG. 2, the information processing system 11 is configured by connecting the user terminal 13 and a server device 14 via a network 12 such as the Internet.

The user terminal 13 is, for example, an information processing terminal such as a so-called smartphone, and can execute various applications in response to a user operation, for example, an application for providing a settlement service of making a settlement by electronic money. Furthermore, the user terminal 13 includes an initial setting application 21, a secure element 22, and middleware 23.

The server device 14 executes the initial setting process on the user terminal 13 via the network 12, and changes the shipment key SK protecting the protection area SD to the main key RK as described with reference to FIG. 1. Furthermore, the server device 14 includes a tamper resistant device 31 and a processing device 32.

The initial setting application 21 is an application for executing the initial setting process as described with reference to FIG. 1. For example, when acquiring a user operation of instructing to start the initial setting process, the initial setting application 21 instructs the middleware 23 to start the initial setting process.

As described above with reference to FIG. 1, the secure element 22 is provided with the plurality of protection areas SD, and FIG. 2 illustrates only one protection area SD. The protection area SD illustrated in FIG. 2 is an area for protecting and storing management information which is various types of information for managing the protection area SD, and stores setting information (values used for deriving individual key values, a procedure for deriving individual key values, and the like) to be referred to at the time of performing the key change among the management information.

For example, the setting information includes ID acquisition method information, key change model information, shipment key derivation chip vendor information, and shipment key master key version information. The ID acquisition method information is information indicating an acquisition method of a secure element identification (ID) for uniquely specifying the secure element 22. The key change model information is information for specifying the protection area SD in which the key change is necessary. The shipment key derivation chip vendor information is information indicating a value specifying the chip vendor from which the shipment key is derived. The shipment key master key version information is information indicating the version of the master key of the shipment key. Note that these pieces of information are stored in the protection area SD at the time of shipment of the semiconductor chip on which the secure element 22 is provided.

The middleware 23 is software for executing processing between the application executed by the user terminal 13 and hardware such as the secure element 22. For example, as illustrated in FIG. 2, the middleware 23 includes a setting reading processing unit 41, an ID acquisition processing unit 42, and a processing execution unit 43, and starts the initial setting process when an instruction to start the initial setting process is given from the initial setting application 21.

In the initial setting process, the setting reading processing unit 41 performs a setting reading process of reading the setting information stored in the protection area SD of the secure element 22 from the protection area SD without performing mutual authentication with the secure element 22. For example, the setting reading processing unit 41 executes a process of selecting the protection area SD in which the setting information is stored among the plurality of protection areas SD, and executes a process of acquiring the setting information by specifying an address indicating the area in which the setting information is stored.

Then, the setting reading processing unit 41 supplies the ID acquisition method information among the setting information read from the protection area SD to the ID acquisition processing unit 42. Furthermore, the setting reading processing unit 41 supplies the key change model information, the shipment key derivation chip vendor information, and the shipment key master key version information among the setting information read from the secure element 22 to the processing execution unit 43.

In the initial setting process, the ID acquisition processing unit 42 acquires the secure element ID from the secure element 22 in accordance with the ID acquisition method information supplied from the setting reading processing unit 41. Here, a method of acquiring the secure element ID is different for every chip vendor, and the ID acquisition method information stored in the secure element 22 is required in order to acquire the secure element ID. Then, the ID acquisition processing unit 42 supplies the secure element ID acquired from the secure element 22 to the processing execution unit 43.

The processing execution unit 43 transmits, to the server device 14, an initial setting request that includes at least the key change model information, the shipment key derivation chip vendor information, the shipment key master key version information, and the secure element ID and requests a change from the shipment key SK to the main key RK.

Then, in the initial setting process, the processing execution unit 43 receives a setting reading command transmitted from the setting reading processing unit 51 as a response to the initial setting request transmitted to the server device 14, and executes processing according to the setting reading command. Furthermore, the processing execution unit 43 receives a key change command transmitted from a key change processing unit 52 and executes processing according to the key change command. Note that details of the setting reading command and the key change command and the processing according to these commands will be described later.

The tamper resistant device 31 has a structure in which information stored therein is protected from being analyzed from the outside, and for example, a master key MK for every chip vendor serving as a master of the shipment key SK is stored.

The processing device 32 performs processing which needs to be executed on the server device 14 side among the processing performed in the initial setting process. For example, as illustrated in FIG. 2, the processing device 32 includes the setting reading processing unit 51 and the key change processing unit 52, and starts processing when receiving the initial setting request transmitted from the user terminal 13.

The setting reading processing unit 51 performs a setting reading process on the basis of the secure element ID, the key change model information, the shipment key derivation chip vendor information, and the shipment key master key version information included in the initial setting request transmitted from the user terminal 13. Here, as described above, the setting reading processing unit 41 of the user terminal 13 performs the setting reading process without authentication, whereas the setting reading processing unit 51 performs the setting reading process with authentication.

For example, in a case where the setting reading process is performed by performing mutual authentication with the secure element 22, the setting reading processing unit 51 first derives a session key which is a valid key only in one mutual authentication section on the basis of the shipment key SK of the protection area SD in which the setting information is stored. For example, the setting reading processing unit 51 specifies the master key MK corresponding to the shipment key SK to be subjected to the key change from among a plurality of master keys MK stored in the tamper resistant device 31 according to the shipment key derivation chip vendor information and the shipment key master key version information. Then, the setting reading processing unit 51 derives a session key personalized for every secure element 22 on the basis of the secure element ID.

Subsequently, the setting reading processing unit 51 constructs a secure communication protocol (for example, a communication protocol in which communication content is protected by performing mutual authentication between communication endpoints) using the session key, and performs mutual authentication with the secure element 22. Then, the setting reading processing unit 51 selects the protection area SD in which the setting information is stored, specifies an address indicating the area in which the setting information is stored, and transmits, to the user terminal 13, a setting reading command of instructing to read the setting information.

Thereafter, in accordance with the setting reading command, when the processing execution unit 43 reads the setting information from the protection area SD and transmits the setting information to the server device 14, the setting reading processing unit 51 receives the setting information. Then, the setting reading processing unit 51 verifies the received setting information by using a message authentication code for checking whether the setting information is not spoofed. Therefore, when confirming that the setting information is not spoofed, the setting reading processing unit 51 supplies the setting information to the key change processing unit 52.

When the verified setting information is supplied from the setting reading processing unit 51, the key change processing unit 52 performs mutual authentication with the secure element 22 and executes the key change process using the verified setting information.

For example, the key change processing unit 52 first specifies the protection area SD requiring the key change on the basis of the key change model information included in the setting information supplied from the setting reading processing unit 51.

Subsequently, the key change processing unit 52 specifies the master key MK of the shipment key SK to be subjected to the key change from among the plurality of master keys MK stored in the tamper resistant device 31 according to the shipment key derivation chip vendor information and the shipment key master key version information. Then, the setting reading processing unit 51 derives a session key personalized for every secure element 22 in accordance with the secure element ID on the basis of the shipment key SK which protects the protection area SD in which the setting information is stored, and derives key change information necessary for the key change. Here, the key change information necessary for the key change is, for example, an object in a state in which the key (main key RK) after the change is encrypted with the key (shipment key SK) before the change.

Moreover, the key change processing unit 52 constructs a secure communication protocol using the session key and performs mutual authentication with the secure element 22. Then, the setting reading processing unit 51 selects the protection area SD to be subjected to the key change, and transmits, to the user terminal 13, a key change command of instructing to change the key using the key change information.

Thereafter, when the processing execution unit 43 changes the protection of the protection area SD from the shipment key SK to the main key RK according to the key change command, the key change processing unit 52 verifies the protection state of the protection area SD using the message authentication code for confirming that the protection area SD is protected by the main key RK. At this time, the key change processing unit 52 repeatedly performs processing from a process of selecting the protection area SD and transmitting the key change command according to the number of protection areas SD requiring the key change to a process of verifying the protection state of the protection area SD.

The information processing system 11 is configured as described above, and the setting information to be referred to when the shipment key SK is changed to the main key RK is stored in the protection area SD of the secure element 22 at the time of shipment of the semiconductor chip on which the secure element 22 is provided. Therefore, by referring to the setting information, the information processing system 11 can derive a necessary key value and more reliably perform the key change even when information for deriving an individual key value, a procedure of deriving the individual key value, or the like is different depending on the type of the chip vendor or the semiconductor chip.

Moreover, in the information processing system 11, the protection area SD to be subjected to the key change can be specified by a verifiable method, the protection area varying depending on the type or use of the user terminal 13, and the shipment key SK of the protection area SD can be changed to the main key RK. By performing such verification, in the information processing system 11, for example, even in a case where the setting information is spoofed, the spoofing can be detected, the integrity can be protected, and the key change can be reliably performed.

<Initial Setting Process>

The initial setting process performed in the information processing system 11 will be described with reference to the flowcharts illustrated in FIGS. 3 and 4.

Figure 3:
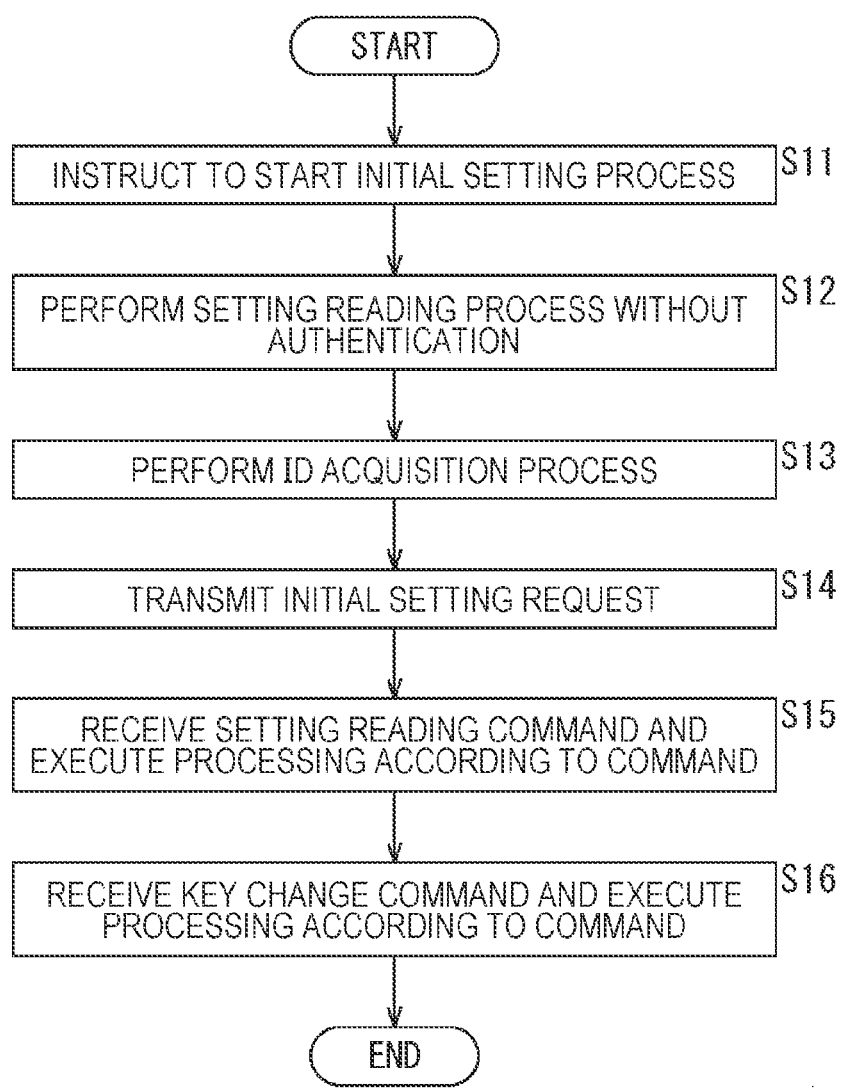
FIG. 3 is a flowchart illustrating an initial setting process performed on a user terminal side.

FIG. 3 is a flowchart illustrating processing performed on the user terminal 13 side in the initial setting process.

For example, when a user activates the initial setting application 21 and performs a user operation of instructing to start the initial setting process, the processing is started, and in step S11, the initial setting application 21 instructs the middleware 23 to start the initial setting process.

In step S12, the setting reading processing unit 41 performs a setting reading process of reading the setting information from the protection area SD without authentication with the secure element 22. Then, the setting reading processing unit 41 supplies the ID acquisition method information among the setting information read from the protection area SD to the ID acquisition processing unit 42, and supplies the key change model information, the shipment key derivation chip vendor information, and the shipment key master key version information to the processing execution unit 43.

In step S13, the ID acquisition processing unit 42 acquires the secure element ID from the secure element 22 in accordance with the ID acquisition method information supplied from the setting reading processing unit 41 in step S12, and supplies the secure element ID to the processing execution unit 43.

In step S14, the processing execution unit 43 transmits, to the server device 14, the initial setting request which includes the key change model information, the shipment key derivation chip vendor information, and the shipment key master key version information acquired by the setting reading processing unit 41 in step S12, and the secure element ID acquired by the ID acquisition processing unit 42 in step S13.

In step S15, the processing execution unit 43 receives the setting reading command (see step S22 in FIG. 4 to be described later) transmitted from the setting reading processing unit 51, and executes processing according to the setting reading command. That is, the processing execution unit 43 reads the setting information according to the address specified by the setting reading command in the protection area SD selected by the setting reading command, and transmits the setting information read from the protection area SD to the server device 14.

In step S16, the processing execution unit 43 receives the key change command (see step S23 in FIG. 4 to be described later) transmitted from the key change processing unit 52, and executes processing according to the key change command. That is, the processing execution unit 43 changes the protection of the protection area SD from the shipment key SK to the main key RK using the key change information transmitted by the key change command.

Then, in step S16, after the shipment key SK protecting the protection area SD is changed to the main key RK, the processing ends.

Figure 4:
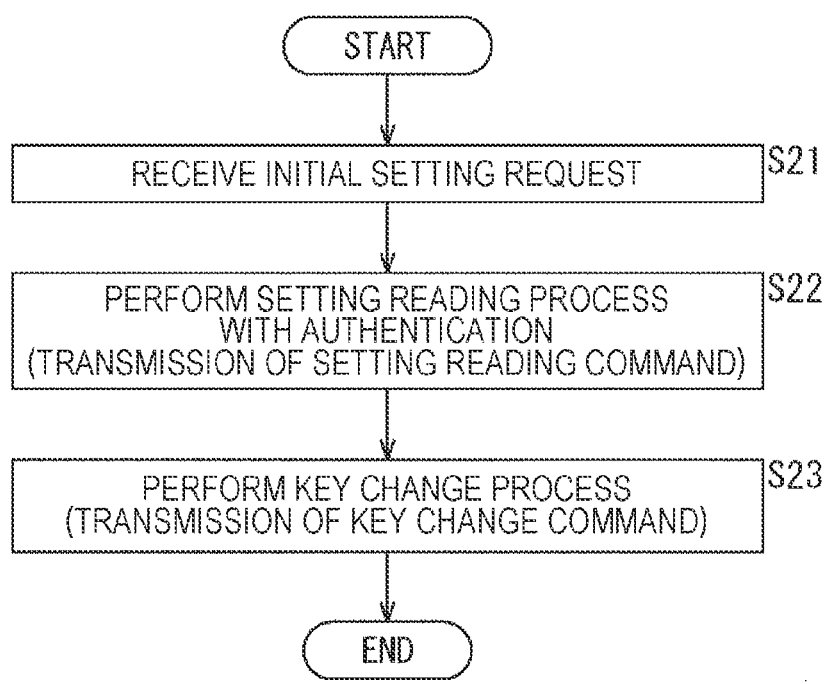
FIG. 4 is a flowchart illustrating an initial setting process performed on a server device side.

FIG. 4 is a flowchart illustrating processing performed on the server device 14 side in the initial setting process.

In step S21, the processing device 32 receives the initial setting request transmitted from the user terminal 13 in step S14 of FIG. 3.

In step S22, the setting reading processing unit 51 performs the setting reading process with authentication, and transmits a setting reading command during the process.

That is, as described above, the setting reading processing unit 51 constructs a secure communication protocol using the session key, and transmits the setting reading command of instructing to read the setting information from the protection area SD in which the setting information is stored. Then, the setting reading processing unit 51 receives the setting information transmitted after the processing according to the setting reading command (see step S15 in FIG. 3) is performed, and performs verification using the message authentication code. Moreover, in the case of confirming that the setting information is not spoofed as a result of the verification using the message authentication code, the setting reading processing unit 51 supplies the setting information to the key change processing unit 52.

Note that, in a case where the setting reading processing unit 51 cannot confirm that the setting information is not spoofed in the setting reading process in step S22, the processing ends, and in this case, the following key change process is not performed.

In step S23, the key change processing unit 52 performs the key change process using the setting information supplied from the setting reading processing unit 51 in step S22, and transmits the key change command during the process.

That is, as described above, the key change processing unit 52 constructs a secure communication protocol using the session key, and transmits the key change command which includes the key change information necessary for the key change and instructs to change the key. Then, when the process according to the key change command (see step S16 in FIG. 3) is performed, the key change processing unit 52 performs verification using the message authentication code. At this time, the shipment key SK is changed to the main key RK for all the protection areas SD requiring the key change.

Then, in step S23, after the key change process by the key change processing unit 52 is completed, the processing ends.

By performing the initial setting process as described above, the information processing system 11 can more reliably change the key by referring to the setting information stored in the protection area SD of the secure element 22 at the time of shipment.

Moreover, the information processing system 11 specifies the protection area SD as a key change target by a verifiable method, thereby reliably specifying the protection area SD to be subjected to the key change and performing the key change. That is, when the key change model information, which is information for specifying the protection area SD requiring the key change, is spoofed, formerly, there is a possibility that the service is used in a state where the shipment key SK of the protection area SD to be subjected to the key change cannot be changed to the main key RK. In contrast, in the information processing system 11, the processing is stopped in a case where the key change model information is spoofed, and thus it is possible to prevent the service from being used in a state where the protection area SD is not protected by the main key RK.

<Configuration Example of Computer>

Next, the above-described series of processing (information processing method) can be performed by hardware or software. In a case where the series of processing is performed by software, a program configuring the software is installed in a general-purpose computer and the like.

FIG. 5 is a block diagram illustrating a configuration example of an embodiment of the computer in which the program for executing the above-described series of processing is installed.

The program can be recorded in advance in a hard disk 105 or a ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, and a semiconductor memory.

Note that the program can be installed in the computer from the removable recording medium 111 as described above, or can be downloaded to the computer via a communication network or a broadcast network and installed in the built-in hard disk 105. That is, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 102, and an input/output interface 110 is connected to the CPU 102 via a bus 101.

When a command is input by the user operating an input unit 107 and the like via the input/output interface 110, the CPU 102 executes the program stored in a read only memory (ROM) 103 according to the command. Alternatively, the CPU 102 loads the program stored in the hard disk 105 into a random access memory (RAM) 104 and executes the program.

Therefore, the CPU 102 performs the processing according to the above-described flowchart or the processing performed by the configuration of the above-described block diagram. Then, the CPU 102 outputs the processing result from the output unit 106, transmits the processing result from the communication unit 108, or records the processing result in the hard disk 105 via the input/output interface 110, for example, as necessary.

Note that the input unit 107 includes a keyboard, a mouse, a microphone, and the like. Furthermore, the output unit 106 includes a liquid crystal display (LCD), a speaker, and the like.

Here, in this specification, the processing performed by the computer according to the program is not necessarily performed in time series in the order described as the flowchart. That is, the processing performed by the computer according to the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed.

Moreover, in this specification, the system means an aggregation of a plurality of components (devices, modules (parts), and the like), and it does not matter whether or not all the components are in the same housing. Therefore, both a plurality of devices which is housed in separate housings and connected via a network and one device in which a plurality of modules is housed in one housing are systems.

Furthermore, for example, a configuration described as one device (or a processing unit) may be divided to be configured as a plurality of devices (or processing units). Conversely, configurations described above as a plurality of devices (or processing units) may be collectively configured as one device (or a processing unit). Furthermore, a configuration other than the above-described configuration may be added to the configuration of each device (or each processing unit). Moreover, as long as the configuration and operation of the entire system are substantially the same, a part of the configuration of a certain device (or a processing unit) may be included in the configuration of another device (or another processing unit).

Furthermore, for example, the present technology can be configured as cloud computing in which one function is shared by a plurality of devices via a network and jointly processed.

Furthermore, for example, the above-described program can be executed in an arbitrary device. In that case, it is sufficient if the device has a necessary function (functional block and the like) and can obtain necessary information.

Furthermore, for example, each step described in the above-described flowcharts can be executed by one device or shared by a plurality of devices. Moreover, in a case where one step includes a plurality of processes, the plurality of processes included in the one step can be executed by one device or shared by a plurality of devices. In other words, a plurality of processes included in one step can also be executed as processes of a plurality of steps. Conversely, the processes described as a plurality of steps can be collectively executed as one step.

Note that, in the program executed by the computer, processing of steps describing the program may be executed in time series in the order described in this specification or may be executed in parallel or individually at necessary timing such as when a call is made. That is, as long as there is no contradiction, the processing of each step may be executed in an order different from the above-described order. Moreover, the processing of steps describing this program may be executed in parallel with the processing of another program, or may be executed in combination with the processing of another program.

Note that a plurality of the present technologies described in this specification can be implemented independently as long as there is no contradiction. Of course, a plurality of arbitrary present technologies can be implemented in combination. For example, some or all of the present technology described in any of the embodiments can be implemented in combination with some or all of the present technology described in another embodiment. Furthermore, some or all of the above-described arbitrary present technology can be implemented in combination with other technologies not described above.

<Combination Example of Configuration>

Note that the present technology can also have the following configurations.

(1)

An information processing terminal including:

a secure element that has a protection area in which an area in which data to be protected is stored is protected by an encryption key; and a processing execution unit that executes a process of changing, in the secure element, a first key which is the encryption key used at a time of shipment to a second key which is the encryption key different from the first key, in which setting information which is referred to when the first key is changed to the second key is stored at the time of shipment in the protection area.

(2)

The information processing terminal according to (1), in which the setting information includes derivative information used to derive an individual key value serving as the second key, and specific information specifying the protection area to be subjected to change from the first key to the second key.

(3)

The information processing terminal according to (2), in which the derivative information includes ID acquisition information indicating a method of acquiring a secure element identification (ID) uniquely specifying the secure element, shipment key derivation chip vendor information indicating a value specifying a chip vendor from which the first key is derived, and shipment key master key version information indicating a version of a master key serving as a master of the first key.

(4)

The information processing terminal according to (3), further including:

a setting reading unit that reads the setting information from the secure element; and an ID acquisition unit that acquires the secure element ID in accordance with the ID acquisition information included in the setting information read by the setting reading unit.

(5)

The information processing terminal according to (4), in which the processing execution unit transmits, to a server device, a request for requesting the change from the first key to the second key, the request including at least the specific information, the shipment key derivation chip vendor information, the shipment key master key version information, and the secure element ID, and performs a setting reading process of reading the setting information from the protection area with authentication according to a setting reading command transmitted from the server device in response to the request, and transmits the setting information to the server device.

(6)

The information processing terminal according to (5), in which the processing execution unit executes a process of changing the first key to the second key according to a key change command including key change information obtained by encrypting the second key with the first key, the key change command being transmitted from the server device in response to the request.

(7)

An information processing method of an information processing device including:

performing, in a secure element having a protection area in which an area in which data to be protected is stored is protected by an encryption key, a process of changing a first key which is the encryption key used at a time of shipment to a second key which is the encryption key different from the first key, in which setting information which is referred to when the first key is changed to the second key is stored at the time of shipment in the protection area.

(8)

A program for causing a computer of an information processing device to execute:

performing, in a secure element having a protection area in which an area in which data to be protected is stored is protected by an encryption key, a process of changing a first key which is the encryption key used at a time of shipment to a second key which is the encryption key different from the first key, in which setting information which is referred to when the first key is changed to the second key is stored at the time of shipment in the protection area.

(9)

An information processing device including:

a tamper resistant device that stores a master key serving as a master of a first key which is an encryption key used at a time of shipment in a secure element of a user terminal having a protection area in which an area in which data to be protected is stored is protected by the encryption key, and is protected from analysis from outside; and a processing device that performs, by using the master key stored in the tamper resistant device, a process of changing the first key to a second key on the basis of setting information which is stored at the time of shipment in the protection area and referred to when the first key is changed to the second key which is the encryption key different from the first key.

(10)

The information processing device according to (9), in which the setting information includes derivative information used to derive an individual key value serving as the second key, and specific information specifying the protection area to be subjected to change from the first key to the second key.

(11)

The information processing device according to (10), in which the derivative information includes ID acquisition information indicating a method of acquiring a secure element identification (ID) uniquely specifying the secure element, shipment key derivation chip vendor information indicating a value specifying a chip vendor from which the first key is derived, and shipment key master key version information indicating a version of a master key serving as a master of the first key.

(12)

The information processing device according to (11), in which the processing device includes a setting reading processing unit that reads the setting information with authentication from the secure element.

(13)

The information processing device according to (12), in which when a request which includes at least the specific information, the shipment key derivation chip vendor information, the shipment key master key version information, and the secure element ID and requests the change from the first key to the second key is transmitted from the user terminal, the setting reading processing unit transmits a setting reading command for reading the setting information from the protection area with authentication to the user terminal in response to the request.

(14)

The information processing device according to (13), in which the processing device includes a key change processing unit that derives the second key from the master key by using the specific information, the shipment key derivation chip vendor information, and the shipment key master key version information acquired by the setting reading processing unit with authentication.

(15)

The information processing device according to (14), in which the key change processing unit transmits a key change command including key change information obtained by encrypting the second key with the first key to the user terminal.

(16)

An information processing method of an information processing device including:

performing, by using a master key stored in a tamper resistant device that stores the master key serving as a master of a first key which is an encryption key used at a time of shipment in a secure element of a user terminal having a protection area in which an area in which data to be protected is stored is protected by the encryption key, and is protected from analysis from outside, a process of changing the first key to a second key on the basis of setting information which is stored at the time of shipment in the protection area and referred to when the first key is changed to the second key which is the encryption key different from the first key.

(17)

A program for causing a computer of an information processing device to execute:

performing, by using a master key stored in a tamper resistant device that stores the master key serving as a master of a first key which is an encryption key used at a time of shipment in a secure element of a user terminal having a protection area in which an area in which data to be protected is stored is protected by the encryption key, and is protected from analysis from outside, a process of changing the first key to a second key on the basis of setting information which is stored at the time of shipment in the protection area and referred to when the first key is changed to the second key which is the encryption key different from the first key.

(18)

An information processing system including:

a secure element that has a protection area in which an area in which data to be protected is stored is protected by an encryption key; and a processing execution unit that executes a process of changing, in the secure element, a first key which is the encryption key used at a time of shipment to a second key which is the encryption key different from the first key, in which setting information which is referred to when the first key is changed to the second key is stored at the time of shipment in the protection area, and a user terminal is connected via a network to a server device that includes a tamper resistant device that stores a master key serving as a master of the first key and is protected from analysis from outside, and a processing device that performs, by using the master key stored in the tamper resistant device, a process of changing the first key to the second key on the basis of the setting information.

Note that this embodiment is not limited to the above-described embodiments, and various modifications can be made without departing from the scope of the present disclosure. Furthermore, the effects described in this specification are merely examples and are not limited, and other effects may be provided.

REFERENCE SIGNS LIST

11 Information processing system
12 Network
13 User terminal
14 Server device
21 Initial setting application
22 Secure element
23 Middleware
31 Tamper resistant device
32 Processing device
41 Setting reading processing unit
42 ID acquisition processing unit
43 Processing execution unit
51 Setting reading processing unit
52 Key change processing unit

The invention claimed is:

1. An information processing terminal comprising:
a secure memory including a protection area in which an area in which data to be protected is stored is protected by an encryption key; and
a processing execution unit configured to execute a process of changing, in the secure memory, a first key which is the encryption key used at a time of shipment to a second key which is the encryption key different from the first key, wherein
setting information which is referred to when the first key is changed to the second key is stored at the time of shipment in the protection area,
the setting information includes derivative information used to derive an individual key value serving as the second key, and specific information specifying the protection area to be subjected to change from the first key to the second key, the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key, and the processing execution unit is implemented via at least one processor.

2. The information processing terminal according to claim 1, further comprising:
a setting reading unit configured to read the setting information from the secure memory; and
an ID acquisition unit configured to acquire the secure element ID in accordance with the ID acquisition information included in the setting information read by the setting reading unit,
wherein the setting reading unit and the ID acquisition unit are each implemented via at least one processor.

3. The information processing terminal according to claim 2, wherein
the processing execution unit is further configured to
transmit, to a server device, a request for requesting the change from the first key to the second key, the request including at least the specific information, the shipment key derivation chip vendor information, the shipment key master key version information, and the secure element ID, and
perform a setting reading process of reading the setting information from the protection area with authentication according to a setting reading command transmitted from the server device in response to the request, and transmit the setting information to the server device.

4. The information processing terminal according to claim 3, wherein
the processing execution unit is further configured to execute a process of changing the first key to the second key according to a key change command including key change information obtained by encrypting the second key with the first key, the key change command being transmitted from the server device in response to the request.

5. An information processing method of an information processing device comprising:
performing, in a secure memory having a protection area in which an area in which data to be protected is stored is protected by an encryption key, a process of changing a first key which is the encryption key used at a time of shipment to a second key which is the encryption key different from the first key, wherein
setting information which is referred to when the first key is changed to the second key is stored at the time of shipment in the protection area,
the setting information includes derivative information used to derive an individual key value serving as the second key, and specific information specifying the protection area to be subjected to change from the first key to the second key, and
the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key.

6. A non-transitory computer-readable medium having embodied thereon a program, which when executed by a computer causes the computer to execute an information processing method, the method comprising:
performing, in a secure memory having a protection area in which an area in which data to be protected is stored is protected by an encryption key, a process of changing a first key which is the encryption key used at a time of shipment to a second key which is the encryption key different from the first key, wherein
setting information which is referred to when the first key is changed to the second key is stored at the time of shipment in the protection area,
the setting information includes derivative information used to derive an individual key value serving as the second key, and specific information specifying the protection area to be subjected to change from the first key to the second key, and
the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key.

7. An information processing device comprising:
a tamper resistant memory configured to store a master key serving as a master of a first key which is an encryption key used at a time of shipment in a secure memory of a user terminal having a protection area in which an area in which data to be protected is stored is protected by the encryption key, and is protected from analysis from outside; and
a processing device configured to perform, by using the master key stored in the tamper resistant memory, a process of changing the first key to a second key on a basis of setting information which is stored at the time of shipment in the protection area and referred to when the first key is changed to the second key which is the encryption key different from the first key, wherein
the setting information includes derivative information used to derive an individual key value serving as the second key, and specific information specifying the protection area to be subjected to change from the first key to the second key,
the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key, and
the processing device is implemented via at least one processor.

8. The information processing device according to claim 7, wherein
the processing device includes a setting reading processing unit configured to read the setting information with authentication from the secure memory, and
the setting reading processing unit is implemented via at least one processor.

9. The information processing device according to claim 8, wherein
when a request which includes at least the specific information, the shipment key derivation chip vendor information, the shipment key master key version information, and the secure element ID and requests the change from the first key to the second key is transmitted from the user terminal, the setting reading processing unit transmits a setting reading command for reading the setting information from the protection area with authentication to the user terminal in response to the request.

10. The information processing device according to claim 9, wherein
the processing device includes a key change processing unit configured to derive the second key from the master key by using the specific information, the shipment key derivation chip vendor information, and the shipment key master key version information acquired by the setting reading processing unit with authentication, and
the key change processing unit is implemented via at least one processor.

11. The information processing device according to claim 10, wherein
the key change processing unit is further configured to transmit a key change command including key change information obtained by encrypting the second key with the first key to the user terminal.

12. An information processing method of an information processing device comprising:
performing, by using a master key stored in a tamper resistant memory configured to store the master key serving as a master of a first key which is an encryption key used at a time of shipment in a secure memory of a user terminal having a protection area in which an area in which data to be protected is stored is protected by the encryption key, and is protected from analysis from outside, a process of changing the first key to a second key on a basis of setting information which is stored at the time of shipment in the protection area and referred to when the first key is changed to the second key which is the encryption key different from the first key, wherein
the setting information includes derivative information used to derive an individual key value serving as the second key, and specific information specifying the protection area to be subjected to change from the first key to the second key, and
the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key.

13. A non-transitory computer-readable medium having embodied thereon a program, which when executed by a computer causes the computer to execute an information processing method, the method comprising:
performing, by using a master key stored in a tamper resistant configured to store the master key serving as a master of a first key which is an encryption key used at a time of shipment in a secure memory of a user terminal having a protection area in which an area in which data to be protected is stored is protected by the encryption key, and is protected from analysis from outside, a process of changing the first key to a second key on a basis of setting information which is stored at the time of shipment in the protection area and referred to when the first key is changed to the second key which is the encryption key different from the first key, wherein the setting information includes derivative information used to derive an individual key value serving as the second key, and specific information specifying the protection area to be subjected to change from the first key to the second key, and the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key.

14. An information processing system comprising:
a user terminal including
- a secure memory including a protection area in which an area in which data to be protected is stored is protected by an encryption key, and
- a processing execution unit configured to execute a process of changing, in the secure memory, a first key which is the encryption key used at a time of shipment to a second key which is the encryption key different from the first key, wherein setting information which is referred to when the first key is changed to the second key is stored at the time of shipment in the protection area; and a server device including
- a tamper resistant memory configured to store a master key serving as a master of the first key and is protected from analysis from outside, and
- a processing device configured to perform, by using the master key stored in the tamper resistant memory, a process of changing the first key to the second key on a basis of the setting information, wherein the user terminal is connected via a network to the server device, the setting information includes derivative information used to derive an individual key value serving as the second key, and specific information specifying the protection area to be subjected to change from the first key to the second key, the derivative information includes ID acquisition information indicating a method of acquiring a secure element identification (ID) uniquely specifying the secure memory, shipment key derivation chip vendor information indicating a value specifying a chip vendor from which the first key is derived, and shipment key master key version information indicating a version of a master key serving as a master of the first key, and the processing execution unit and the processing device are each implemented via at least one processor.

* * * * *